June 3, 1969    D. R. HUMPHREYS    3,447,385
AXIALLY SHIFTABLE CONTROL KNOBS
Filed Oct. 31, 1967
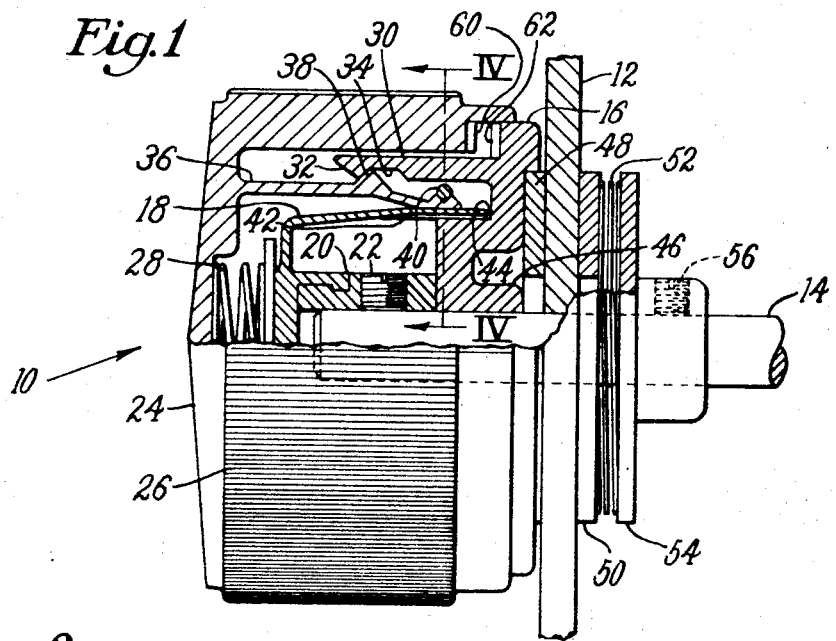
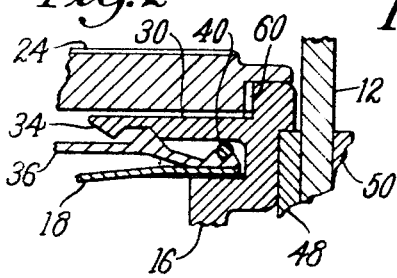
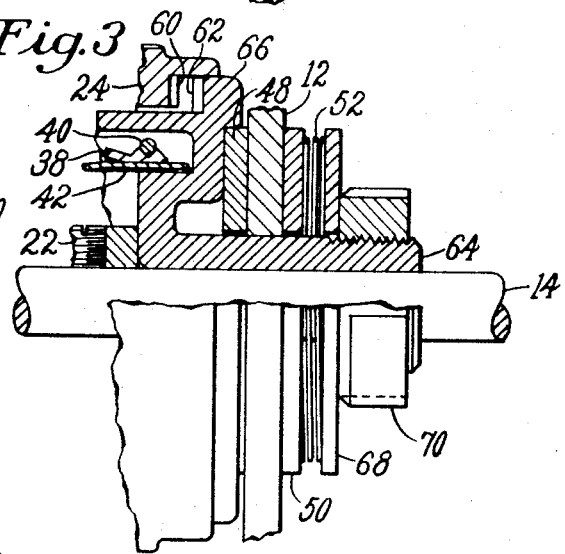
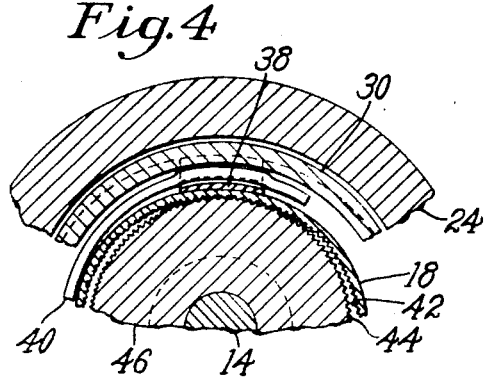
*Inventor*
Donald R. Humphreys
By his Attorney

United States Patent Office 3,447,385
Patented June 3, 1969

3,447,385
AXIALLY SHIFTABLE CONTROL KNOBS
Donald Robert Humphreys, Marblehead, Mass., assignor to USM Corporation, Flemington, N.J., a corporation of New Jersey
Filed Oct. 31, 1967, Ser. No. 679,380
Int. Cl. F16h 35/18
U.S. Cl. 74—10.5      5 Claims

ABSTRACT OF THE DISCLOSURE

A low cost control knob comprising three coaxial members each of which is provided with teeth for intermeshing and positively determining direct and reduction drive relation. It has one of its members biased into speed changing relation and adapted to be shifted manually to a direct driving position, thus insuring rotational adjustment with accuracy and ease.

BACKGROUND OF THE INVENTION

This invention pertains to rotational positioning mechanism, and particularly to control knobs for optionally providing coarse, i.e., 1:1 adjustment, or fine positioning. Various arrangements of parts with different degrees of complexity have hitherto been provided in control of vernier knob assemblies. In general, unless they are relatively expensive they are usually subject to backlash and are inaccurate or become so through use, and hence are often unreliable over a period of time. Knob assemblies relying on frictional drive, though usually lower in cost, frequently lack the positive control essential to refined rotary positioning as required in many electronic and other devices.

SUMMARY OF THE INVENTION

In view of the foregoing it is a principal object of this invention to provide a simple, easily assembled rotary positioning means which is compact and capable of precise angular adjustment by direct and reduction drive.

To this end, the invention features the employment of the three coaxial elements of a mechanical harmonic drive actuator as disclosed, for instance, in U.S. Letters Patent No. 2,906,143, namely, a circular spline, a flexspline, and a wave generator for radially deflecting the flexspline into toothed engagement at circumferentially spaced localities and progressing those localities while one of the spline elements serves as a ground or reaction means. In the preferred embodiments shown herein, manual adjustment is applied to a rotary knob formed as the wave generator causing the flexspline, which may have more spline teeth than those of the mating teeth of the reaction circular spline, to be driven at reduced speed. Radial teeth on the wave generator may be intermeshed with corresponding teeth on the circular spline by axially shifting the wave generator to a second operative position wherein the circular spline, otherwise held stationary by a friction clutch, may now directly drive the flexspline as output member. A biasing means may be arranged to yieldingly urge the wave generator toward either of its operating positions depending on whether one expects primarily to perform 1:1 adjustment or more precise positioning.

BRIEF DESCRIPTION OF THE DRAWINGS

The foregoing and other features of the invention will now be described with greater particularity as applicable to alternative arrangements of a preferred embodiment and the reference to the accompanying drawings thereof, in which:

FIG. 1 is a view in side elevation of a control knob assembly mounted on a panel, an upper half of the assembly being in axial section to reveal internal construction, the parts being in reduction drive relationship;

FIG. 2 is a detail view showing parts seen in FIG. 1 when shifted to direct driving relationship;

FIG. 3 is a view similar to FIG. 1 but showing a modified circular spline extending through the mounting panel; and FIG. 4 is a transverse section taken on the line IV—IV in FIG. 1.

Referring to FIG. 1, a knob assembly generally designated 10 is mounted as will later be explained on a control panel 12 bored to receive a rotary shaft 14 which is to be rotatably adjusted about its axis. For this purpose the knob is comprised of three coaxial elements, namely a circular spline 16 rotatably receiving the shaft 14, a tubular flexspline 18 the hub 20 of which is affixed to the shaft by a set screw 22, and a generally cup-shaped wave generator 24 axially shiftable as later explained. For facilitating input rotation of the wave generator its external surface may be milled as at 26. A compression spring 28 disposed between the flexspline 18 and the closed end of the wave generator 24 urges the latter axially to the left to the extent normally permitted by detent arms 30 (FIGS. 1 and 2) integral with the circular spline 16. Each of the arms 30 has a slightly yieldable radial protrusion 32 and an internal, axial recess 34 providing snap-fit when telescopically receiving diametrically opposed, axially-extending, wave imposing arm portions 36 of the wave generator 24. Each of the portions 36 has an intermediate projecting stop portion 38 axially slidable within limits of the corresponding recess 34, thereby radially stiffening notched, arcuate end portions. The latter have an inner diameter that is maintained by a wire loop 40 received in their notches and adapted to urge axial spline teeth 42 formed internally of the flexspline 18 into meshing relation at diametrically opposed localities with a smaller number of external spline teeth 44 formed on a hub 46 of the circular spline 16.

Incidentally the flexspline hub 20, when preferred for purposes of manufacture and assembly, perhaps using one portion of plastic and another of metal, may be an interlocked composite as shown in FIG. 1.

From the foregoing it will be undrestood that, in the relative positions of parts indicated in FIGS. 1 and 4 the wave generator portions 38 impose an ellipsoidal wave shape on the flexspline 18 and hence interengagement of the spline teeth 42, 44 at diametrically opposed localities and disengagement at intermediate positions. Accordingly, input rotation of the wave generator 24 assuming the circular spline 16 anchored by the mounting to be explained, results in a reduced output speed of the flexspline 18 and therefore refined positive angular positioning of the shaft 14. If desired, wave generators of three or more lobes may be employed in lieu of ellitoidal shapes.

The knob assembly 10 of FIG. 1 is shown mounted by means of a pair of friction brake disks 48, 50 embracing the panel 12. The disk 48 nests in an end face of the circular spline 16, the pressure of engagement therebetween being adjustably determined by a take-up spring 52. This spring is suitably held under compression by a confining disk 54 provided with a setscrew 56 threaded in its collar portion for abutment with the shaft 14.

When it is desired to provide coarse or more rapid (i.e. 1:1) angular positioning, one merely urges the wave generator 24, against resistance of the spring 28, axially toward the panel 12 to engage face teeth 60 (FIGS. 1 and 3) on the wave generator with corresponding face teeth 62 formed on the circular spline 16 and continuous manual rotation of the wave generator in either direction. The relative position of the parts is illustrated in FIG. 2. Now the circular spline overcomes frictional resistance afforded by the brake disk 48 and the flexspline 18 is driven directly through the spline teeth 44.

Without basically changing the operation just described and only revising the circular spline hub 46 to extend through the panel 12 an alternate mounting of the illustrative knob assembly is provided as shown in FIG. 3, other parts remaining essentially the same. Thus an elongated hub 64 of a circular spline 66 extends through the clutch disk 48, 50 the panel 12, and washer 68 and a take-up nut 70 threaded on the hub 64.

It will be apparent that, though the wave generator 24 is herein shown as acting radially inward, it may in an alternate construction be employed to dilate the flexspline outwardly for effecting interengagement.

It will be appreciated from the foregoing that the invention provides a compact and inexpensive assembly, free of backlash and easily operated positively to rotate an element with precise positioning.

Having thus described my invention, what I claim as new and desire to secure by Letters Patent of the United States is:

1. A rotary control knob assembly comprising, in coaxial relation, a circular spline having formed thereon a set of circular spline teeth and a set of radial teeth, mounting means for the circular spline adapted to resist its rotation, a positively driven flexspline and an input wave generator, both in telescoping relation to the circular spline, the flexspline having internal spline teeth meshing with and more in number than the set of circular spline teeth, and the wave generator having radial teeth arranged to be engaged with said circular spline radial teeth, the arrangement being such that relative axial movement of the wave generator and the circular spline to engage their radial teeth couples them for co-rotation to provide 1:1 drive through the flexspline, and relative rotation of the wave generator with respect to the circular spline when the radial teeth are disengaged provides a positive reduction drive through the flexspline for effecting the refined angular adjustment.

2. A control knob assembly as set forth in claim 1 wherein a yieldable means is disposed between the flexspline and the wave generator to bias the parts toward reduction drive relation.

3. A control knob assembly as set forth in claim 2 wherein cooperative coaxial arms of the wave generator and of the circular spline telescope into slidable snap-fit relation.

4. In a control knob assembly for optional direct drive or reduction drive of a rotary member, a circular spline rotatably receiving the member and circumferentially formed with radial teeth and having an inner hub provided with axial spline teeth, a flexspline secured on the member and having internal spline teeth meshing with, but more in number than, the circular spline teeth, an axially movable hollow wave generator coaxially enclosing the circular spline and the flexspline, said wave generator having teeth engageable with said radial teeth to provide positive 1:1 drive of the member upon rotation of the wave generator, and means axially biasing the wave generator, out of direct drive relation with the circular spline and into an operating position wherein the spline teeth are meshed by the wave generator at circumferentially spaced localities for positive reduction drive of the member by the wave generator through the flexspline.

5. A knob assembly as set forth in claim 4 wherein the wave generator comprises internal axially extending, diametrically opposed wave imposing arms, and the circular spline is provided with internal axial arms formed slidably to retain the wave generator in telescoped relation for movement between its operative position, said circular spline arms being relatively unyielding and radially disposed to urge said wave imposing arms against the flexspline to effect meshing of its spline teeth.

References Cited

UNITED STATES PATENTS

| | | | |
|---|---|---|---|
| 2,658,395 | 11/1953 | Coates | 74—10.52 |
| 3,385,116 | 5/1968 | Carlson et al. | 74—10.54 |

FOREIGN PATENTS 249,805  10/1926  Great Britain.

MILTON KAUFMAN, *Primary Examiner.*

U.S. Cl. X.R.

74—10.8, 640